United States Patent
Klima, Jr.

[11] Patent Number: 5,997,964
[45] Date of Patent: *Dec. 7, 1999

[54] LIQUID CRYSTAL DISPLAY

[75] Inventor: Walter F. Klima, Jr., Batavia, N.Y.

[73] Assignee: Sprayex LLC, Stafford, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/434,796

[22] Filed: May 4, 1995

Related U.S. Application Data

[63] Continuation of application No. 07/683,736, Apr. 11, 1991, abandoned.

[51] Int. Cl.$^6$ ..................................................... C09K 19/00
[52] U.S. Cl. .................. 428/1; 349/86; 349/122; 349/187; 374/161; 374/162; 428/195; 428/204; 428/320.2; 428/903; 428/913
[58] Field of Search ...................... 428/1, 195, 204, 428/320.2, 903, 913; 252/299.01; 359/52, 103; 349/187, 86, 122; 374/161, 162

[56] References Cited

U.S. PATENT DOCUMENTS

| | | | |
|---|---|---|---|
| 3,585,381 | 6/1971 | Hodson | 428/1 |
| 3,655,971 | 4/1972 | Haas et al. | 350/330 |
| 3,663,390 | 5/1972 | Fergason et al. | 350/330 |
| 3,871,904 | 3/1975 | Haas | 428/1 |
| 4,028,118 | 6/1977 | Nakasuji | 428/913 |
| 4,222,641 | 9/1980 | Stolov | 350/331 |
| 4,305,807 | 12/1981 | Somlyody | 350/331 |
| 4,403,830 | 9/1983 | Gerstner | 350/331 |
| 4,597,636 | 7/1986 | Hoshikawa | 428/1 |
| 4,728,547 | 3/1988 | Vaz et al. | 350/331 |
| 4,786,773 | 11/1988 | Keefer | 374/161 |
| 4,884,877 | 12/1989 | Fergason et al. | 350/330 |
| 4,891,250 | 1/1990 | Weibe | 428/1 |
| 5,072,234 | 12/1991 | Crystal | 428/1 |
| 5,088,807 | 2/1992 | Waters | 428/1 |
| 5,145,546 | 9/1992 | Yuasa | 428/1 |
| 5,194,972 | 3/1993 | Lim | 359/46 |

Primary Examiner—Nasser Ahmad
Attorney, Agent, or Firm—Klima & Pezzlo, P.C.

[57] ABSTRACT

A liquid crystal display and method of making. The display includes a layer of support material stabilizing a layer of liquid crystal material in dimensional thickness and uniformity. The invention is particularly well suit for making heat-sensitive display labels.

20 Claims, 1 Drawing Sheet

LIQUID CRYSTAL DISPLAY

This application is a continuation of application Ser No. 07,683,736, filed Apr. 11, 1991 now abandoned.

BACKGROUND OF THE INVENTION

1. Field of the Invention

This invention relates to a liquid crystal device for displaying information and to a method from producing such a device. More specifically, to a device having liquid crystal material stabilized by a support layer of material. In one embodiment, the support layer acts as a light shutter for information supplied underneath the liquid crystal support layer. For example, the liquid crystal material is coated on at least one side of a layer of absorptive material such as paper to dimensionally stabilize the thickness and uniformity of the liquid crystal material to provide an effective light shutter in the completed device. Examples of a liquid crystal device according to the present invention include a temperature sensitive label, a variable information display for example to be fixed substantially permanently on an instrument or part, and other types of fixed or variable information display devices.

2. Prior Art

Liquid crystal displays are in common use today such as on calculators, portable computers, office equipment including printers and copiers, etc. These displays are used on these devices for providing variable information to users such as numbers, letters, other indicia such as, sensing indicator displays and other types of information. Most of these common devices provide a variable information display by activating a layer of liquid crystal material by changing the electrical and/or magnetic field, or changing the temperature such as by heating specific points in the layer of liquid crystal.

Typically, in these prior art devices liquid crystal cells are implemented for the display. The liquid crystal cells are defined by structure for containing a layer of liquid crystal due to the liquid nature of this material. The container is necessary to provide a layer of liquid crystal of sufficient thickness to provide an effective display in combination with maintaining the thickness of the layer throughout the entire plane of the display. Improved liquid crystal cells are constructed by providing ground glass particles or beads of a specific layer thickness for maintaining a fixed distance between the plates of the cell during construction and use of the display.

Other displays provide uniform thickness liquid crystal layers by microencapsulating liquid material in a matrix such as plastic resin, which is cast or machined into a uniform layer. Still others devices appear to form a liquid crystal composition that includes chemical components to dimensionally stabilize the layer by changing the phase of the material to a solid.

SUMMARY OF THE INVENTION

Accordingly, it is a primary object of the present invention to form a display device having a layer of liquid crystal stabilized by a support layer of material.

Another object of the present invention is to provide an improved liquid crystal display.

A further object of the present invention is to provide a liquid crystal display according to the present invention in the format of a label.

A still further object of the present invention is to provide a liquid crystal display having a support layer of absorptive material impregnated with liquid crystal material.

An even further object of the present invention is to provide a liquid crystal display having a support layer of absorptive material impregnated with liquid crystal material, which support layer becomes translucent upon being coated by the liquid crystal material.

An even still further object of the present invention is to provide a liquid crystal display having a support layer of material stabilizing a layer of liquid crystal material.

Another object of the present invention is to provide a method of making the liquid crystal display according to the present invention.

A further object of the present invention is to provide a method of making the liquid crystal display according to the present invention including coating a support layer of absorptive material on at least one side, preferably both sides, with liquid crystal material to form a light shutter, layering the support layer between a base layer and a covering layer, and providing information to be displayed on either the support layer or the base layer, or both.

A still further object of the present invention is to provide a method of making the liquid crystal display according to the present invention including coating a support layer on at least one side, preferably both sides, with liquid crystal material to form a light shutter, layering the support layer between a base layer and a covering layer, and providing information to be displayed on either the support layer and or base layer, or both.

These and other objects of the invention are accomplished by providing a display device having a support layer made of material capable of absorbing or binding liquid crystal material. The support layer is provided with liquid crystal material on at least one side, which contains or binds the liquid crystal material so as to make the layer of liquid crystal dimensionally stable in thickness and of sufficient thickness to perform as an effective light shutter. The support layer must dimensionally stabilize the liquid crystal layer in a manner so as not to interfere with the chemical properties, or only effect the chemical properties to a limited extent, so that the liquid crystal layer can function properly chemically in a specific display design by for example acting as a light shutter and/or changing color. Examples of support layers include various papers (including various cellulose based materials), felts and clothes or combination thereof that do not chemically react to the various liquid crystal materials. Further examples include composite layers of papers, felts or clothes in combination with synthetic materials (e.g. plastic) or layers to bind the liquid crystal within a matrix. The exact physical and chemical properties of the paper, cloth, felt or composite such as the sizing, weight, color, residual chemicals, layering, composition, fiber size, etc. can be controlled or selected to optimize the display characteristics of the device for a specific application.

Another important property of the support layer is its ability to transmit light therethrough. The support layer should be made of a material that is transparent or translucent, or one that becomes transparent or translucent upon the application of liquid crystal material, or upon other chemical or physical treatment. The support layer in the embodiment made of absorptive material may be totally saturated with the liquid crystal material with even a possible surface excess. Alternatively, only an amount of liquid crystal material is supplied during the coating operation so that it is totally absorbed in the support layer with no surface excess (i.e. unsaturated). As an example, an opaque layer of paper or cloth can be impregnated throughout its entire thickness to become translucent or essentially transparent to the information displayed during activation of the liquid crystal layer.

The support layer is layered on one side with a base layer of material. The base layer and/or support layer is provided with information to be displayed when the liquid crystal material is activated. Specifically, information can be deposited on or formed within these layers by various techniques such as printing with inks, thermal activation for example with laser beams or other known techniques of information imprinting or impregnation. The opposite side of the support layer is layered with a cover layer of material that is at least partially transparent or translucent so that the information provided on the base layer and/or support layer is displayed upon activation of the liquid crystal material.

The layer of liquid crystal material can be coated or applied by dipping or some other technique such as spraying onto the support layer. Further, the information can be developed or provided in or on the base layer by various techniques such as by printing including screen or mask printing, gravure printing, offset printing and lithographic-type printing.

The cover layer is provided to contain the liquid crystal material stabilized by the support layer, and to also provide a protective layer for the display. Preferably, the cover layer is a clear, colorless transparent material, for example, a layer of Mylar, polyethylene and polypropylene.

The base layer can be prepared or treated such as by providing a layer of adhesive, for example contact sensitive adhesive, on its outer side to form a sticky back label.

The base layer and/or the support layer depending on the design of the information displayed are made of materials selected so as to have the proper surface properties to enable information to be deposited thereon such as during a printing process. The surface roughness, ink affinity, porosity and other physical properties are selected for depositing a marking substance with good display characteristics. Also, the selection of the printing technique in combination with specific substrate material are selected to develop a good information display. For example, colored Mylar film provides a good base layer and low weight tracing paper provides a good support layer.

The display according to the present invention should be constructed to display information in a clear manner with high resolution to be effective as a display. Further, other quality factors of the finished display must be taken into consideration including the reflectivity of the cover layer, brightness of the information displayed. These factors can all be controlled by known printing methods and proper selection of the materials forming the base, support and cover layers based on the known properties of the materials selected.

It is important that the light shutter layer (i.e. support layer) substantially blocks out the transmittance of the display information when not activated. In order to assure essentially complete blockage, the light shutter layer must be made of sufficient and uniform thickness throughout its plane.

BRIEF DESCRIPTION OF THE DRAWINGS

Referring to the drawings, wherein like reference characters refer to like parts throughout the several views, and wherein.

DETAILED DESCRIPTION OF THE PREFERRED EMBODIMENTS

The present invention is concerned with liquid crystal displays. The liquid crystal displays according to the present invention can be activated through any of the various known techniques such as changing the electronic field, magnetic field, or temperature at various points, regions, or the entire field within the layer containing the liquid crystal material. Further, the liquid crystal displays according to the present invention are particularly well suited for providing displays that utilize a layer of liquid crystal to act as a thermally activated light shutter. The present invention is particularly well suited for the production of labels wherein the light shutter is activated to transmit light or information (e.g. fixed information) when the layer of liquid crystal is heated.

The liquid crystal material utilized in the present invention are of type well known in the art. Specific formulations directly applicable for use in the present invention are discussed in U.S. Pat. No. 4,028,118, incorporated herein by reference.

The layer of liquid crystal is stabilized physically and/or chemically by a support layer. The support layer can be a layer of absorptive material that can absorb and/or bind the liquid crystal material, or alternatively, can be an adhering layer that binds and/or at least partially absorbs a layer of liquid crystal material. At least one of these layers is necessary to provide a sufficient thickness of liquid crystal material in a uniform thickness throughout its plane to function as an effective light shutter. Further, the support layer provides a liquid crystal layer with good mechanical characteristics such as tensile strength and can withstand mechanical manipulation during construction of the display. Also, the support layer provides a liquid crystal layer format that is easy to handle during construction of the displays.

Depending on the type of liquid crystal and the temperature, the support layer can contain what would otherwise be a layer of liquid, which by nature is relatively difficult to contain in an article, especially during assembly of a display. The support layer is very important in the high speed production of the displays by absorbing and/or binding the liquid crystal material, of a type in a liquid or solid phase, during the assembly stages of the display.

Figure 1:
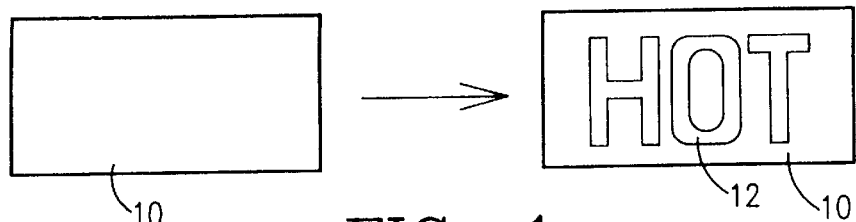
FIG. 1 is a sequence diagram illustrating the operation of a display made according to the present invention.

In FIG. 1, the sequence of operation of a liquid crystal display 10 made according to the present invention is shown. During the inactivate stage (left diagram), the display does not provide any information. Upon activation of the display (right diagram), such as by heating, the liquid crystal material associated with the support layer allows the transmittance of light and information 12 (e.g. "HOT"). The light shutter is deactivated upon cooling of the display again hiding the information. The display can be cycled through the display off/on stages an indefinite number of times.

Figures 2, 3, 4:
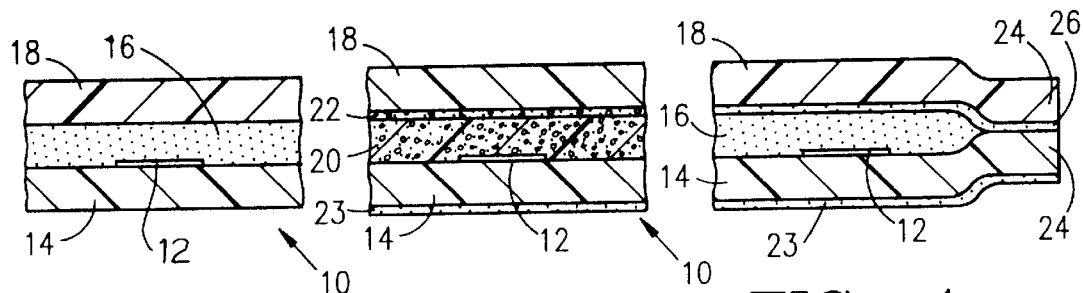
FIG. 2 is a cross-sectional view of an embodiment of the display made according to the present invention.
FIG. 3 is a cross-sectional view of another embodiment of the display made according to the present invention.
FIG. 4 is a cross-sectional view of a label made according to the present invention.

A detailed cross section of an embodiment of the display 10 according to the present invention is shown in FIG. 2. The display in this embodiment comprises a base layer 14, a support layer 16 made of absorptive material, and a cover layer 18. The liquid crystal material utilized in this embodiment is contained within a support layer 16 made of the absorptive material. The liquid crystal material can be applied to the absorptive material layer 16 by coating at least one side of the absorptive material layer 16, or preferably both sides, during the method of making. The liquid crystal material may be partially absorbed into the absorptive material layer 16, or preferably is saturated therewith. Further, the absorptive material support layer 16 may also support a thin layer of liquid crystal material on one or both sides that is not fully absorbed into this layer. In any event, the absorptive support layer material 16 substantially stabilizes what essentially is a layer of liquid crystal material, which is in the liquid phase above a specific temperature.

The absorptive material layer 16 is made of a substance that can be clear, colorless, transparent, translucent or any combination thereof to a sufficient extent so that information can be transmitted through this layer upon activation of the liquid crystal material contained therein. For example, a paper or cloth can be utilized as the absorptive material layer 16. In order for this material to become translucent, it must be sufficiently saturated with the liquid crystal material. Alternatively, other materials, particularly fiber materials, capable of at least partially absorbing the liquid crystal material can be substituted therefore. However, these other fiber material must be transparent or translucent, or become transparent or translucent when covered or saturated with liquid crystal material (e.g. fiber glass roving or mat).

The support layer is preferably made of a material that can be made into the form of a web for the high speed production of making displays according to the present invention. Fibrous material are particularly well suited for this purpose since they can be formed into a web having sufficient tensile strength to prevent tearing and sufficient absorbency of the liquid crystal material. Papers, felts and clothes are the preferred materials for the making the support layer, since they are inexpensive, readily available in many grades and variety of specifications for different applications and purposes, and since these types of materials have the property of being opaque and becoming transparent or translucent upon absorbing liquid crystal material. Most preferred, are thin papers such as tracing paper or onion skin paper, since they become almost transparent upon absorbing liquid crystal material.

Further, the preferred support layer materials of paper, felt and cloth after being coated during an operation with hot liquid crystal material, become a wax-like solid (i.e. dry) when cooled to room temperature and provide an excellent stock material for handling purposes during the high speed production of displays, especially labels.

The information 12 is shown in FIG. 2 as being located on the lower surface of the support layer 16. For example, the rear of the support layer 14 can be reversed printed with information in the form of indicia. Alternatively or in combination, the base layer 14 may be provided with information to be displayed.

The base layer can be made of a material that may or may not absorb the ink from a printing operation. However, in the case of a non-absorptive surface, the ink can be stabilized in or on the surface of the base layer with various known techniques such as pretreating the surface by etching. Alternatively, the base layer can be made of a material that will readily absorb and fix the ink. However, in the case of an absorptive base layer, the outer surface should be treated, coated or laminated with a layer of material to form a liquid barrier to prevent the liquid crystal material from leaching or being absorbed through the base layer 14 to the outer surface of the display.

As an alternative embodiment, the information 12 can be printed on the outside surface of a transparent or translucent base layer 14, such as clear Mylar. Opaque material can also be used such as white or colored Mylar to enhance the visibility of the display.

Another embodiment of a display made according to the present invention is shown in FIG. 3. In this embodiment, the support layer 20 is made of adhering material. A liquid crystal layer 22 is applied to the adhering layer 20 for stabilization. The adhering layer 20 can be a fibrous material such as paper treated with a binder or adhesive having an affinity for liquid crystal, and which limits the absorbency of the fibrous material. This embodiment differs from the embodiment shown in FIG. 2, by stabilizing the liquid crystal material in a layer on the surface of the support layer 22 as opposed to stabilizing the liquid crystal material within the support layer 16. However, the extent of absorption and formation of a separate layer depends on such factors as the type of material and the manner of forming the material into a layer. Further, this embodiment is provided with a contact adhesive layer 23 to form a sticky back label.

The ends of the display should be sealed to prevent the flow of liquid crystal material therefrom. For example, as shown in FIG. 4, the ends 24,26 of the cover layer 18 and base layer 14, respectively, are sealed together by providing a clear adhesive layer 26 therebetween. This method of sealing the ends is particularly suitable for the high speed production of displays according to the present invention. This particular display arrangement is the end product of a method of making to be described below with the assembly line shown in FIG. 5.

Figure 5:
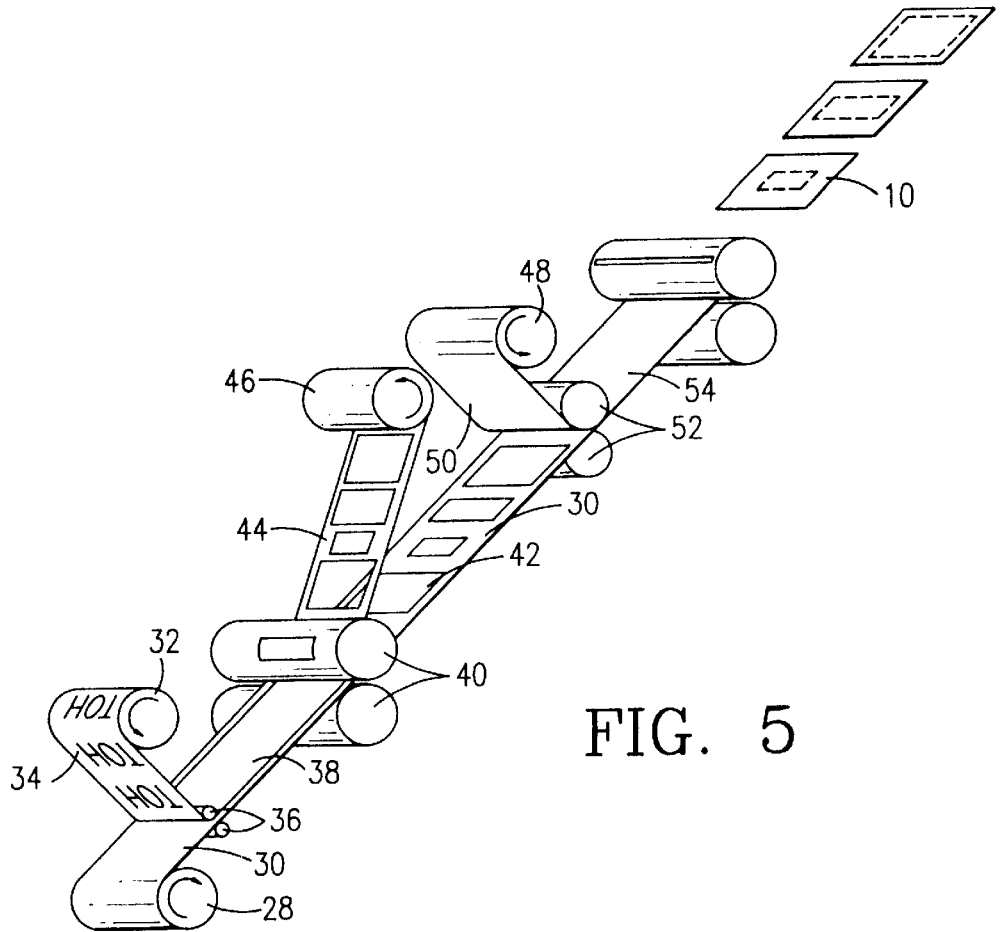
FIG. 5 is an illustration of an assembly line for producing the label shown in FIG. 2.

An embodiment of a method of making a display according to the present invention is illustrated in FIG. 5. A roll 28 of stock material comprising a web 30 to form a base layer in the assembled display is supplied. For example, the stock material can be a colored or white Mylar film. A roll 32 of stock material comprising a web 34 of support material such as paper previously reverse printed, for example screen or flexo printed with indicia, on its rear surface and treated with liquid crystal material is supplied. Preferably, the printing operation is carried out prior to the liquid crystal coating operation. Further, preferably the paper web is coated on both sides with a hot liquid crystal composition. In a preferred process, the web 34 is handled at a temperature at which the liquid crystal is in a wax-like solid phase to ease handling, and prevent the flow of the liquid crystal material from the web (i.e. messing).

The side of the web 34 facing the web 30 is provided with a double sided type clear adhesive layer with a release liner for handling purposes. The remaining release liner is removed prior to bringing the webs 30 and 34 together. Alternatively, the web 30 is provided with the adhesive layer and release liner. A pair of pinching rollers 36 is provided for adhering the webs 30,34 together to produce a combined web 38. The combined web 38 is fed to a die cut roller station 40 where the web 34, only, is die cut into individual support layer sections 42 carried on the web 30. The waste portion 44 of the web 34 is stripped from the web 30 and formed into a roll 46.

A roll 48 comprising transparent web 50 of cover layer is supplied. The web 50 is laminated by heat and/or adhesive at the laminating station 52 to the web 30 carrying the support layer sections 42. The resulting composite web 54 is fed to a die cutting station 56 where the web 54 is cut into individual displays 10.

EXAMPLES

| Formulation A | |
|---|---|
| 160 grams | Stearyl Alcohol (Manufactured by C. P. Hall) |
| 40 grams | Polyethylene 9A (Manufactured by Allied Signal) |
| 15 grams | Bis-Phenol A (Manufactured by Aristech Chemical) |
| 5 grams | Crystal Violet Lactone (Manufactured by Milton Davis) |

A 10–20 pound paper web is coated on both sides with formulation A. The web is blue in color below 50 degrees Celsius and becomes colorless and transparent above 50 degrees Celsius. This web is used in combination with a white colored Mylar web to produce labels as shown and described with respect to FIG. 5.

Example I

A white colored Mylar web is printed with bright orange colored ink to form the words "CAUTION HOT". The white colored web is laminated with the above-described blue web and the blue web is laminated with a clear Mylar web from which labels according to the present invention are formed therefrom and described above.

Example II

A white colored Mylar web is printed with the words "FOOD WARM". The label is used to indicate the time at which food or liquid in a package becomes warm in a microwave oven.

Example III

The crystal violet lactone in Formulation A is replaced by other dye(s) to produce virtually any color. At the transition temperature, the material becomes colorless.

Example IV

The stearyl alcohol in formulation A is replaced by other aliphatic alcohols to vary the transition temperature of the liquid crystal web between −10 to 70 degrees Celsius. The temperature range can be expanded further by varying the polymer (e.g. polyethylene) used in formulation A.

I claim:

1. A heat-sensitive display for selectively displaying information depending on temperature, said display comprising:
    a substantially opaque polyester base layer;
    a heat-sensitive layer, said heat-sensitive layer including a support layer made of sheet material stabilizing a heat-sensitive material in dimensional thickness and uniformity, said heat-sensitive layer being configured and made of a heat-sensitive material selected so that said heat-sensitive layer is substantially colored and opaque at a lower temperature and substantially colorless and transparent at a higher temperature; and
    an information marking provided on at least one of said base layer and said heat-sensitive layer and positioned behind said heat-sensitive layer so that said information marking is not displayed when said heat-sensitive layer is substantially colored and opaque and displayed when said heat-sensitive layer is substantially colorless and transparent.

2. A display according to claim 1, wherein said support layer is made from a separate piece of sheet material prior to incorporation into the display.

3. A display according to claim 1, wherein said information marking is provided on a back side of said support layer.

4. A display according to claim 1, wherein said information marking is provided on a front side of said base layer.

5. A label according to claim 1, wherein said label information marking is provided on a back side of said support layer.

6. A display according to claim 5, wherein said fiber material is paper.

7. A label according to claim 1, wherein said support layer is made of a material that becomes translucent upon application of liquid crystal material.

8. A display according to claim 7, wherein said support layer is made of paper.

9. A display according to claim 2, wherein said support layer is made of sheet material cut from a web of material.

10. A display according to claim 1, wherein said heat-sensitive material is one selected from the group consisting of a heat-sensitive liquid crystal material and a heat-sensitive dye.

11. A display according to claim 2, wherein said information marking is printed on a front side of said base layer.

12. A display according to claim 2, wherein said information marking is printed on a back side of said support layer.

13. A display according to claim 1, including an adhesive layer provided on a back side of said base layer for attaching the display to items.

14. A heat-sensitive display for a microwavable package, said display comprising:
    an opaque polyester base layer;
    a heat-sensitive layer, said heat-sensitive layer being configured and made of a heat-sensitive material selected so that said heat-sensitive layer is substantially colored and opaque at a lower temperature and substantially colorless and transparent at a higher temperature;
    a cover layer, said heat-sensitive layer being layered between said base layer and said cover layer; and
    an information marking indicating relative temperature of the microwavable package provided on at least one of said base layer and said heat-sensitive layer and positioned behind said heat-sensitive layer so that said information marking is not displayed when said heat-sensitive layer is substantially colored and opaque and displayed when said liquid crystal layer is substantially colorless and transparent.

15. A display according to claim 5, wherein said fiber material is felt.

16. A display according to claim 5, wherein said fiber material is cloth.

17. A display label according to claim 7, wherein said support layer is made of felt.

18. A display according to claim 7, wherein said support layer is made of cloth.

19. A display according to claim 14, wherein said information marking indicating relative temperature is a word "HOT".

20. A display according to claim 1, wherein said display is substantially thin for applying to an article as a label.

* * * * *